Oct. 21, 1969    D. G. JELATIS ET AL    3,474,250
ANNULAR SHIELDING FOR MASTER-SLAVE MANIPULATORS
Filed Feb. 21, 1966    2 Sheets-Sheet 1
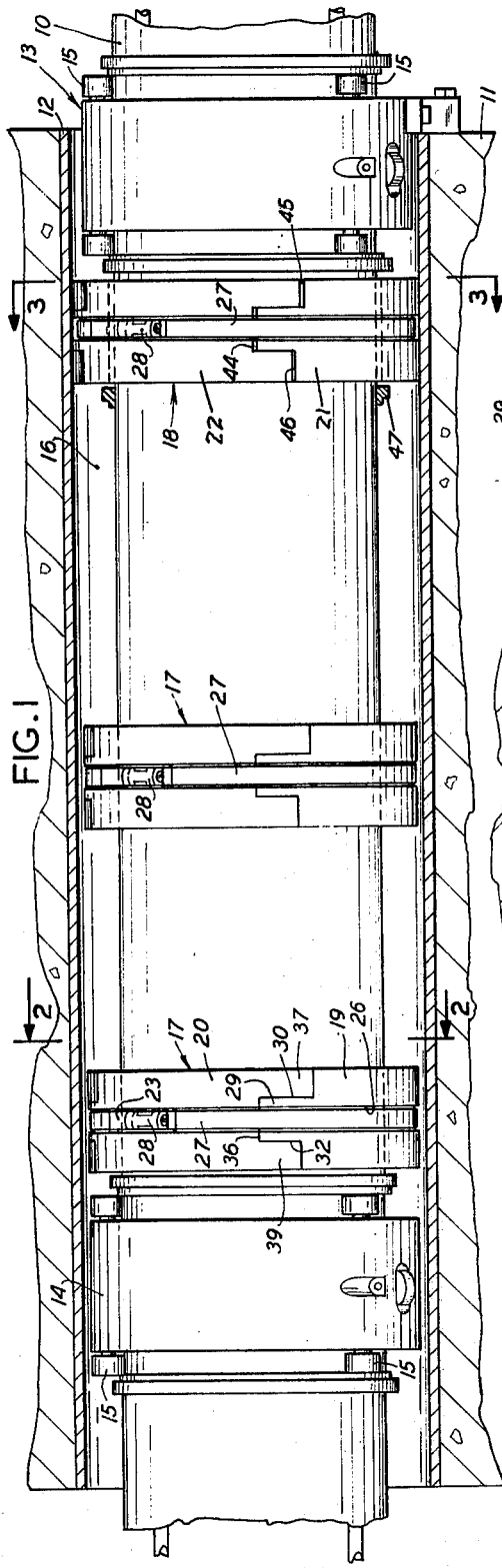
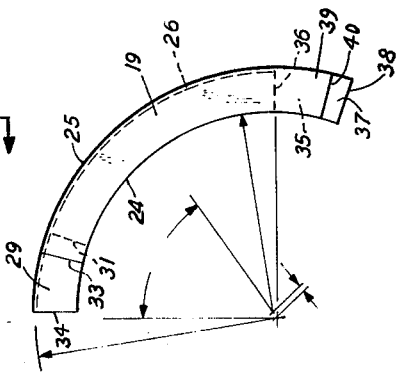
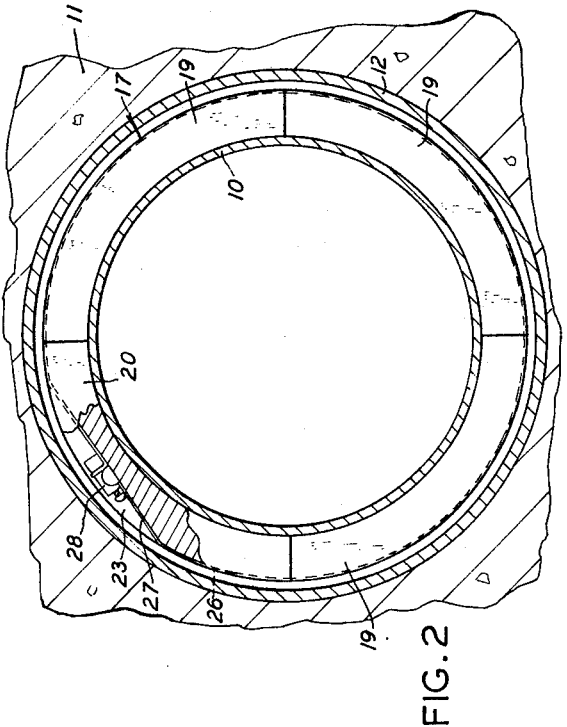
INVENTORS
DEMETRIUS G. JELATIS
LESTER W. HAAKER
GERALD A. EISERT
BY
Braddock+Burd
ATTORNEYS Oct. 21, 1969  D. G. JELATIS ET AL  3,474,250
ANNULAR SHIELDING FOR MASTER-SLAVE MANIPULATORS
Filed Feb. 21, 1966  2 Sheets-Sheet 2
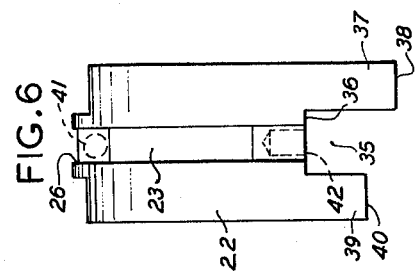
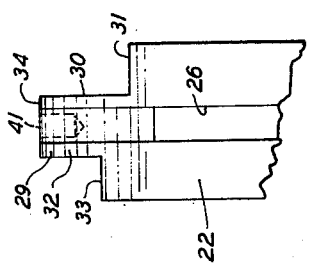
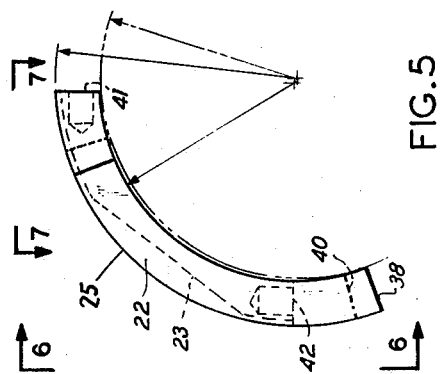
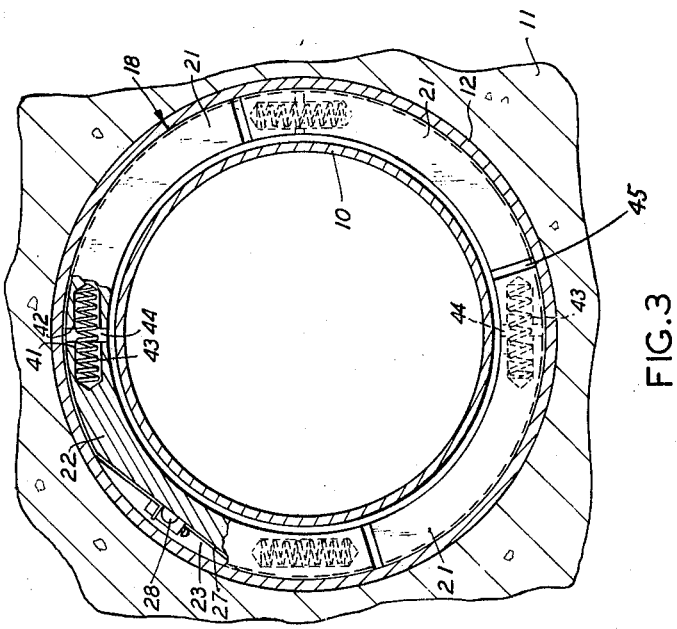
INVENTORS
DEMETRIUS G. JELATIS
LESTER W. HAAKER
BY GERALD A. EISERT
Braddock+Burd
ATTORNEYS United States Patent Office 3,474,250
Patented Oct. 21, 1969

3,474,250
ANNULAR SHIELDING FOR MASTER-SLAVE MANIPULATORS
Demetrius G. Jelatis and Lester W. Haaker, Red Wing, and Gerald A. Eisert, Hastings, Minn., assignors to Central Research Laboratories, Inc., Red Wing, Minn., a corporation of Minnesota
Filed Feb. 21, 1966, Ser. No. 529,058
Int. Cl. G21f 7/00, 7/06
U.S. Cl. 250—108    12 Claims

ABSTRACT OF THE DISCLOSURE

A labyrinthine annular shielding system for a remote-control master-slave manipulator having a horizontal tubular support disposed for rotation in a tubular opening in a barrier wall, for protection of the operator against radiation passing through the annular space between the tubular support and tubular opening. The shielding system comprises a plurality of rings of radiation absorptive material disposed spaced apart along the tubular opening. At least one of the rings hugs the outer wall of the tubular support and at least one hugs the inner wall of the tubular opening. The rings each have a thickness less than that of the annular space so as not to interfere with rotation of the tubular support but greater than half of that thickness so that no straight line radiation path exists through the annular space. Each shielding ring is made up of a plurality of arcuate segments disposed in interlocking end-to-end relation with tongue and groove joints between adjacent segment ends and means for maintaining the segments in assembled relation.

---

This invention relates to shielding for the horizontal support or through tube of through-the-wall remote-control master-slave manipulators. Such master-slave manipulators comprise generally a master arm and a slave arm, each pivotally connected to one of the opposite ends of a generally horizontal tubular support which extends through a generally vertical shielding wall. The through tube is mounted in a sleeve or tube set in the wall so as to permit rotation of the through tube about its longitudinal axis with resulting transmission of side-to-side or X motion from the master arm to the slave arm. Typical of such manipulators are those shown in Jelatis et al. United States Patents No. 2,888,154 issued May 26, 1959, and No. 3,139,990 issued July 7, 1964. More particularly, this invention relates to shielding in the annular space between the through tube and wall opening in which the manipulator is mounted, when the through tube is supported on truck mounts as described and claimed in copending application Ser. No. 529,057, filed Feb. 21, 1966.

The most common use of such manipulators is in the handling of radioactive materials in a dangerous area on one side of the barrier wall by an operator stationed at the safe area on the opposite side of that wall. The hazardous rays and particles emitted from such dangerous substances as may be handled with the manipulator tend to travel in straight lines along paths of varying length. In order to prevent endangering of personnel due to the escape of harmful radioactive products, such as gamma radiation, through the opening in the barrier wall through which the manipulator extends, pains must be taken to eliminate any straight line path by which harmful radiation can escape to the safe side of the barrier wall. The present invention is directed to a shielding system for the annular space between the manipulator through tube and opening through the barrier wall in which that through tube fits. The shielding system according to the present invention is adapted to provide one set of shielding elements which are closely fitted to the outside perimeter of the annular space and another set of shielding elements which are tightly fitted to the inside periphery of the annular space so as to effectively absorb any radiation steaming through the annular passage but without interfering with rotation of the through tube.

It is the principal object of the present invention to provide a system of annular shielding in the annular space between the through tube of a remote control master-slave manipulator and the opening in the barrier wall in which such a manipulator is installed.

Other objects of the invention will become apparent as the description proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is an elevation, partly in section, showing a through tube of a master-slave manipulator mounted in a barrier wall and utilizing roller truck mounts and utilizing annular shielding according to the present invention;

FIGURE 2 is an end elevation, partly in section along the line 2—2 of FIGURE 1 and in the direction of the arrows, on a slightly enlarged scale and partly broken away to further reveal the structure, showing the inside diameter shielding elements fixed in place on a through tube;

FIGURE 3 is an end elevation, partly in section along the line 3—3 of FIGURE 1 and in the direction of the arrows, on a slightly enlarged scale and partly broken away to further reveal the structure, showing the outside diameter shielding means fixed in place in the opening in the barrier wall;

FIGURE 4 is an end elevation of one shielding element or segment from which the annular shielding assembly of FIGURE 2 is formed;

FIGURE 5 is an end elevation of one element or segment from which the annular shielding structure of FIGURE 3 is formed showing the modified structure for adapting the segments for fitting the outside diameter of the annular space;

FIGURE 6 is a side elevation of the segment of FIGURE 5 shown as viewed along the line 6—6 of FIGURE 5 and in the direction of the arrows; and FIGURE 7 is a top side view from along the line 7—7 of FIGURE 5 and in the direction of the arrows and positioned with respect to FIGURE 6 to show how ends of adjacent segments mate.

Referring now to the drawings, and particularly to FIGURE 1, there is shown the horizontal support or through tube 10 of a remote control master-slave manipulator. The through tube 10 extends through a protective shielding or barrier wall 11 which is of substantial thickness. The opening for passage of the through tube through wall 11 is ordinarily fitted with a tube or sleeve 12. Through tube 10 is supported within sleeve 12 by a master roller truck mount assembly 13 at one end and a slave roller truck mount assembly 14 at the other end. The structure of the roller truck mounts is described and claimed in detail in the copending application referred to above. The roller truck mounts per se form no part of the present invention. The through tube 10 is supported for rotation about its longitudinal axis by means of a plurality of rollers 15 journalled for rotation on parallel longitudinal axes and mounted in the opposite edge faces of the rings which form the bodies of the roller truck mounts.

An annular space 16 exists between the inner wall surface of sleeve 12 and the outer wall surface of through tube 10. It is within this annular space that the annular shielding according to the present invention is located. The annular shielding is installed in assemblies of two general types. The first of these, indicated generally at 17, is an inside diameter assembly fitted with a tight fit against the outer periphery or wall surface of through tube 10. The other of these shielding assemblies, indicated generally at 18, is an outside diameter assembly fitted with a tight fit against the inner periphery or wall surface of sleeve 12. The shielding assembly 18 is stationary and the through tube rotates within it. The shielding assembly 17 rotates with the through tube.

Each annular shielding assembly is composed of a plurality of arcuate segments which when fitted together form a circular ring. The segments, while generally similar, have minor variations in structure. In order to distingiush these variations, the segments comprising the inside diameter assembly 17 are designated as 19 and 20 and those comprising the outside diameter assembly 18 are designated as 21 and 22.

As seen in FIGURE 2, each inside diameter annular shielding assembly is composed of four segments in all, three identical segments 19 and one segment 20 which differs in that it has a deeper flat channel 23 in its outer perimeter to permit fastening of the shielding segments tightly around the through tube 10. It will be apparent that each annular shielding assembly may be made up of fewer or more segments than the four shown. Each segment 19 is generally arcuate. It has an inside arcuate face 24 of radius corresponding substantially to the radius of the outside wall of through tube 10 so that a tight face fit is obtained between the shielding segments and the through tube. The thickness of each segment 19 is slightly less than that of annular space 16. Desirably the shielding assembly should occupy as much of the width of annular space 16 as possible in order to give maximum shielding protection but, at the same time, sufficient clearance must be provided so that the outer perimeter does not scrape against the wall of sleeve 12 and interfere with the normal operation of the manipulator.

The outer face 25 of segment 19 has a radius corresponding generally to that of the inside surface of sleeve 12. The outer face 25 of each segment 19 has a shallow peripheral groove 26 to receive and locate a strap 27 for fastening the assembly in place. The deeper flat channel 23 of segment 20 is an extension of and deepening of peripheral groove 26. As seen in FIGURES 1 and 2, a flat metal strap 27 extends around the segments 19 and 20 comprising the inside diameter assembly 17. The ends of strap 27 are fastened together by means of a clamp 28 which fits into channel 23 of segment 20 so as not to protrude beyond the perimeter of that segment so as to interfere with the free rotation of the through tube when the assembly is in place. On the inside diameter assembly 17 strap 27 is clamped tightly so as to hold the assembly in contact with the outer surface of through tube 10.

The ends of the arcuate segments 19 and 20 fit together in a modified tongue and groove relationship. Each segment is provided at one end with a projecting tongue 29. One side or face of tongue 29 (designated as 30) extends farther from radially extending shoulder 31 than does the opposite shorter side or face 32 extend beyond radially extending shoulder 33 on the opposite side of the segment. The end face 34 of tongue 29 also extends generally radially.

The opposite end of each shielding segment is provided with a groove 35 adapted to receive tongue 29. The bottom 36 of groove 35 extends generally radially. The wall 37 defining one side of groove 35 is longer and corresponds in length to the longer face 30 of tongue 29. The end of longer wall 37 is defined by a generally radial face 38. The opposite side of groove 35 is defined by a generally shorter wall 39 corresponding in length to the shorter face 32 of tongue 29 and terminating in a generally radial face 40.

Upon assembly of the segments in end-to-end relation, tongue 29 fits into groove 35 with its radial face 34 butting against radial face 36 of the groove. The longer groove wall 37 fits into the space defined by the longer wall 30 of tongue 29 and shoulder 31 with the radial face 38 of wall 37 butting against shoulder 31. Similarly, the shorter wall 39 of groove 35 fits in the space defined by the shorter wall 32 of tongue 29 and shoulder 33 with radial face 40 of wall 39 butting against radial shoulder 33.

The segments are designed to fit with the adjacent faces in close abutting contact. However, any radioactive particles or rays which find their way into any space which may exist between the abutting faces finds its path of travel blocked by the tongue projecting beyond the abutting faces. Because the abutting faces are offset by the differing lengths of the opposite sides of the tongue and groove, maximum protection is afforded by the dual thickness of the tongue and the opposite offset groove wall thickness.

The segments 19 and 20 are preassembled on the through tube 10 and secured tightly in place by strap 27 held by clamp 28. One or more inside diameter shielding assemblies 17 may be used as desired or necessary. The assemblies may be of varying widths depending upon the requirements of a particular installation. Typically the assemblies may range from about 2 to 6 inches wide and from about ¾ to 1½ inches thick depending upon the thickness of the annular space 16.

The segments 21 and 22 comprising the outside diameter annular shielding assembly 18 are generally the same as the segments 19 and 20 already described. As seen in FIGURE 3, the assembly 18 is composed of three segments 21 and one segment 22, the latter being characterized by a deeper groove 23 adapted to receive clamp 28 for securing together the ends of strap 27. Again, although the assembly is shown as composed of four segments, this number is not critical.

The ends of segments 21 and 22 are adapted to fit together in a modified tongue and groove joint as already described. Each segment is generally arcuate. It has an outside arcuate face 25 having a radius corresponding substantially to the radius of the inside wall of sleeve 12 so that a tight fit is obtained between the shielding segment and the sleeve. Each segment has an inside arcuate face 24 having a radius corresponding generally to that of the outside surface of through tube 10. The thickness of each segment is slightly less than that of annular space 16 so as to permit sufficient clearance between the inside face of shielding assembly 18 and the outside wall of through tube 10, so that the through tube does not scrape against the stationary shielding assembly 18 so as to interfere with the normal operation of the manipulator.

The segments comprising shielding assembly 18 differ from those of shielding assembly 17 in that means are provided for expanding the assembly against the inside wall surface of sleeve 12. This is accomplished by providing a relatively deeply recessed spring receiving seat or socket 41 in the radial face 34 of tongue 29 and a similar deeply recessed spring seat or socket 42 in the radial face 36 of groove 35. The opposite ends of a coil compression spring 43 are inserted in the recesses 41 and 42. Spring 43 is of such length and strentgh as to constantly urge adjacent segments apart.

In assembling the outside diameter shielding assembly 18, a coil spring 43 is inserted in the recesses 41 and 42 between each adjcaent pair of segments 21 and 22 and the segments are assembled into a ring. A strap or band 27 is then placed around the outside perimeter of the ring in peripheral groove 26 and the ends are secured together by means of a clamp 28 situated in the deeper groove 23 of segment 22. The strap is fastened around the ring of segments sufficiently tight to hold them in assembled relation as the adjacent segments are urged apart by means of springs 43, but loosely enough to permit some relative movement or "play" between adjacent segments to permit positioning of the assembly in sleeve 12.

The inside diameter shielding assemblies 17 are secured in place on the through tube 10, along with the roller truck mounts 13 and 14, in advance of insertion of the through tube into sleeve 12. The outside diameter annular shielding assembly 18 is loosely assembled and secured around through tube 10 between the roller truck mounts and preferably between the master roller truck mount 13 and one of the inside diameter annular shielding assemblies 17. A clamp ring is fastened to the through tube 10, allowing ½ to ¼ inch clearance for shield assembly 18. In installation of the manipulator, the through tube is inserted approximately 1/16 inch farther than its normal operating position, so that master truck assembly 13 pushes the shield assembly 18 to its operating position. On retracting the manipulator to its normal position, operating clearance is obtained. When the manipulator is removed from the wall, the clamp ring 47 butts against shield assembly 18 and slides it out of the wall tube 12.

As soon as the through tube assembly is inserted into sleeve 12 sufficiently far to permit engagement of outside diameter shielding assembly 18 with the sleeve, assembly 18 is manually compressed against springs 43 to an overall diameter less than the inside diameter of sleeve 12 and inserted in the sleeve. The force of springs 43 expands the shielding ring into contact with the inside wall surface of sleeve 12. Then, the assembly is pushed far enough into sleeve 12 to permit partial entry of the master roller truck mount 13 therein. Although spring-loaded against the inside surface of sleeve 12, the assembly 18 may be pushed in a tight sliding fit within the sleeve.

As best seen in FIGURE 1, the inside diameter shielding assemblies 17 are secured to through tube 10 and rotate with it, their outer peripheries being spaced inwardly from sleeve 12 sufficiently far to permit clearance for rotation therein. The outside diameter shielding assembly 18 is stationary within sleeve 12 and sufficient clearance exists between the inside surface of shielding assembly 18 and the outside surface of through tube 10 to permit free rotation of the through tube within the shielding assembly 18.

It will be seen that the inside and outside shielding assemblies 17 and 18 define a labyrinth within the annular space 16 between through tube 10 and sleeve 12 such that no hazardous particle or ray traveling in a straight line path can escape through the annular space. At the same time sufficient clearance is provided to permit normal rotation of the through tube about its longitudinal axis.

As best seen in FIGURES 1 and 3, when the outside diameter shielding assembly 18 is in place in sleeve 12 there is a gap 44 between the radial face 34 of tongue 29 and face 36 of groove 35 and a gap 45 between the radial shoulder 31 and radial face 38 of groove wall 37 and a gap 46 between radial shoulder 33 and radial face 40 of the shorter groove wall 39. These gaps result from the expansion of the shielding assembly 18 to contact the interior wall of tube 12. Although some few random radioactive particles or rays may penetrate the gaps facing toward the dangerous working area adequate safety is provided by the extra wall thickness inherent in the offset tongue and groove joint and the labyrinth nature of the narrow spaces between the adjacent fitted surfaces.

For convenience and economy all of the shielding assembly segments are desirably formed with the same general configuration. To this end, in order to insure a secure fit of the inside diameter shielding assembly 17 on the through tube 10 and a secure fit of the outside diameter shielding assembly 18 in the sleeve 12 when made from segments having the same basic structure, the centers from which the inside and outside radii are struck are offset slightly, as best seen in FIGURE 4. The degree of offset is dictated by the dimensions of each particular installation and number of segments comprising the assemblies. In this manner compensation is made for the expanded outside circumference as a result of the gaps between adjacent segments. Similarly, so as to minimize the number of different parts, each segment is provided with a tongue at one end and a groove at the other. One segment could equally wel be made with grooves at both ends to mate with another segment having tongues at both ends.

The shielding segments are composed of radioactive absorptive material. The most common of these for gamma ray shielding are lead and lead based alloys, such as lead-antimony, lead-tin and the like, but plastic materials of large hydrogen content, such as polyethylene, or waxes, such as paraffin, may also be used for more effective shielding of neutron emissions. The shielding system according to the present invention which is directed to shielding of the annular space between the through tube and wall opening is designed for use in conjunction with a labyrinth shielding system for the inside of the through tube as disclosed in copending application Ser. No. 529,059 filed Feb. 21, 1966.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. An annular radiation shielding assembly for the annular space between the horizontal tubular support and wall opening of a remote control master-slave manipulator comprising
   (A) A plurality of substantially identical and interchangeable arcuate interlocking segments of solid radioactive radiation absorptive material disposed in end-to-end relation to form a closed ring,
   (B) each of said segments being of substantially uniform thickness and each having an arcuate inner peripheral face and an arcuate outer peripheral face,
   (C) a tongue and groove joint between each pair of adjacent segment ends, said tongue and groove extending between the peripheral faces transversely relative to the axis of the sheilding ring, and
   (D) means for maintaining said segments in assembled end-to-end relation.

2. An annular shielding assembly according to claim 1 further characterized in that each of said segments is provided with a projecting tongue at one end and a tongue-receiving groove at the other.

3. An annular shielding assembly according to claim 1 further characterized in that said tongue projects farther on one side than on the other and said groove is correspondingly deeper on one side than on the other.

4. An annular shielding assembly according to claim 1 further characterized in that said means for maintaining said segments in assembled end-to-end relation comprises a peripheral groove extending around the outer periphery of said assembly, a flexible strap within said peripheral groove and a clamp securing together the ends of said strap, said peripheral groove being shallow around most of the periphery of said assembly and relatively deeper immediately adjacent said clamp to seat said clamp within the outermost periphery of the assembly.

5. An annular shielding assembly according to claim 1 further characterized in that each tongue and groove of said joint is provided with a generally radial face and a spring-receiving recess is formed in each of said radial faces, the recesses of immediately adjacent radial faces being in substantial axial alignment.

6. In combination, a remote-control master-slave manipulator having a horizontal tubular support disposed in a tubular opening in a barrier wall and a labyrinth annular radiation shielding system disposed in the annular space between said tubular support and tubular opening, said shielding system comprising
   (A) at least two annular shielding assemblies disposed in said annular space,
   (B) at least one of said assemblies being secured to said tubular support in surface contact with the outer wall of the tubular support for rotation therewith within the tubular opening,
   (C) another of said assemblies being spaced longitudinally relative to the first assembly and stationary being secured within said tubular opening in surface contact with the inner wall of the tubular opening in surface contact with the inner wall of the tubular opening for relative rotation of said tubular support therein,
   (D) each of said annular shielding assemblies comprising
      (1) a plurality of arcuate interlocking segments of solid radioactive radiation absorptive material disposed in end-to-end relation to form a closed ring,
      (2) each of said segments being of substantially uniform thickness and each having an arcuate inner peripheral face and an arcuate outer peripheral face,
      (3) a tongue and groove joint between each pair of adjacent segment ends, said tongue and groove extending between the peripheral faces transversely relative to the axis of the shielding ring, and
      (4) means for maintaining said segments in assembled end-to-end relation,
   (E) spring means disposed between each pair of adjacent segment ends of said stationary assembly to urge said assembly segments into contact with the walls of said opening,
   (F) said assembly segments being of a thickness greater than one-half of the thickness of said annular space, whereby straight line passage of radiation products through said annular space is effectively prevented.

7. A combination according to claim 6 further characterized in that the tongue of each of said tongue and groove joints projects farther on one side than on the other and the groove is correspondingly deeper on one side than on the other.

8. A combination according to claim 6 further characterized in that said means for maintaining said segments in assembled end-to-end relation comprises a peripheral groove extending around the outer periphery of each of said assemblies, a flexible strap within said peripheral groove and a clamp securing together the ends of said strap, said peripheral groove being shallow around most of the periphery of the assembly and relatively deeper immediately adjacent said clamp to seat said clamp within the outermost periphery of the assembly, said assembly secured to said tubular support being tightly bound by said strap and said assembly within the tubular opening being loosely bound by said strap to permit expansion of the assembly against the walls of said opening.

9. A shielding segment for forming an annular radiation shielding assembly for the annular space between the horizontal tubular support and wall opening of a remote control master-slave manipulator, said segment comprising
   (A) a solid arcuate member of radioactive radiation absorptive material having generally uniformly spaced apart inner and outer arcuate peripheral faces, and generally parallel opposed side faces,
   (B) one end of said segment having a projecting tongue,
   (C) the opposite end of said segment having a recessed tongue-receiving groove of size and geometrical configuration complementary to said tongue, said tongue and groove extending between the peripheral faces, and
   (D) a shallow peripheral groove in the outer arcuate peripheral face of said member.

10. A shielding segment according to claim 9 further characterized in that said tongue projects farther on one side than on the other and that said tongue-receiving groove is correspondingly deeper on one side than on the other.

11. A shielding segment according to claim 9 further characterized in that each tongue and tongue-receiving groove is provided with a generally radial face and a spring-receiving recess is formed in each of said radial faces.

12. A shielding segment according to claim 9 further characterized in that a relatively deep flat-bottomed peripheral groove is provided in communication with said shallow peripheral groove.

References Cited

UNITED STATES PATENTS 2,720,105    10/1955    Billups.
3,151,244    9/1964     Savouyaud et al.

ARCHIE R. BORCHELT, Primary Examiner

U.S. Cl. X.R.

214—1